United States Patent
Biswas et al.

(10) Patent No.: US 8,099,545 B2
(45) Date of Patent: Jan. 17, 2012

(54) WEAR LEVELING IN STORAGE DEVICES BASED ON FLASH MEMORIES AND RELATED CIRCUIT, SYSTEM, AND METHOD

(75) Inventors: Sudeep Biswas, Delhi (IN); Angelo Di Sena, Castello di Cistema (IT); Domenico Manna, Acerra (IT)

(73) Assignees: STMicroelectronics S.r.l., Agrate Brianza (IT); STMicroelectronics Pvt. Ltd., Greater Noida (IN)

( * ) Notice: Subject to any disclaimer, the term of this patent is extended or adjusted under 35 U.S.C. 154(b) by 0 days.

(21) Appl. No.: 12/973,305

(22) Filed: Dec. 20, 2010

(65) Prior Publication Data

US 2011/0087832 A1    Apr. 14, 2011

Related U.S. Application Data

(62) Division of application No. 12/075,991, filed on May 9, 2007, now Pat. No. 7,882,301.

(51) Int. Cl.
    *G06F 12/00* (2006.01)
(52) U.S. Cl. .............. 711/103; 365/185.29; 365/185.33
(58) Field of Classification Search ................. 711/103; 365/185.29, 185.33
    See application file for complete search history.

(56) References Cited

U.S. PATENT DOCUMENTS

| | | | |
|---|---|---|---|
| 4,800,520 A | 1/1989 | Ijima | |
| 5,107,481 A | 4/1992 | Miki et al. | |
| 5,471,604 A | 11/1995 | Hasbun et al. | |
| 5,479,633 A | 12/1995 | Wells et al. | |
| 5,566,314 A | 10/1996 | DeMarco et al. | |
| 5,832,493 A | 11/1998 | Marshall et al. | |
| 5,867,641 A | 2/1999 | Jenett | |
| 6,104,638 A | 8/2000 | Larner et al. | |
| 6,170,066 B1 | 1/2001 | See | |
| 6,449,625 B1 | 9/2002 | Wang | |
| 6,513,095 B1 | 1/2003 | Tomori et al. | |
| 6,834,331 B1 | 12/2004 | Liu et al. | |
| 6,895,490 B1 | 5/2005 | Moore et al. | |
| 6,973,531 B1 | 12/2005 | Chang et al. | |
| 7,035,993 B2 | 4/2006 | Tai | |
| 7,353,325 B2 | 4/2008 | Lofgren et al. | |
| 7,457,909 B2 | 11/2008 | Di Sena et al. | |
| 2002/0199054 A1 | 12/2002 | Akahane et al. | |

(Continued)

OTHER PUBLICATIONS

Brown et al. (2000) "Fundamentals of Digital Logi With VDHL Design"; McGraw-Hill Higher Education; pp. 2-6.

(Continued)

*Primary Examiner* — Jasmine Song
(74) *Attorney, Agent, or Firm* — Lisa K. Jorgenson; Kevin D. Jablonski; Graybeal Jackson LLP

(57) ABSTRACT

A wear leveling solution is proposed for use in a storage device based on a flash memory. The flash memory includes a plurality of physical blocks, which are adapted to be erased individually. A corresponding method starts with the step for erasing one of the physical blocks. One of the physical blocks being allocated for storing data is selected; this operation is performed in response to the reaching of a threshold by an indication of a difference between a number of erasures of the erased physical block and a number of erasures of the selected physical block. At least the data of the selected physical block being valid is copied into the erased physical block. The selected physical block is then erased.

9 Claims, 9 Drawing Sheets

U.S. PATENT DOCUMENTS

| | | | |
|---|---|---|---|
| 2003/0093606 A1 | 5/2003 | Mambakkam et al. | |
| 2003/0158862 A1 | 8/2003 | Eshel et al. | |
| 2003/0165076 A1 | 9/2003 | Gorobets et al. | |
| 2004/0001370 A1 | 1/2004 | Nakayama | |
| 2004/0039872 A1 | 2/2004 | Takamizawa et al. | |
| 2004/0078666 A1 | 4/2004 | Aasheim et al. | |
| 2004/0255090 A1 | 12/2004 | Guterman et al. | |
| 2004/0268064 A1 | 12/2004 | Rudelic et al. | |
| 2005/0289558 A1 | 12/2005 | Illowsky et al. | |
| 2006/0031710 A1 | 2/2006 | Jo | |
| 2006/0106972 A1* | 5/2006 | Gorobets et al. | 711/103 |
| 2006/0155917 A1 | 7/2006 | DiSena et al. | |
| 2006/0161723 A1 | 7/2006 | Sena et al. | |
| 2006/0184719 A1 | 8/2006 | Sinclair | |
| 2006/0271725 A1 | 11/2006 | Wong et al. | |
| 2007/0016721 A1 | 1/2007 | Gay | |
| 2007/0033329 A1 | 2/2007 | Sinclair et al. | |
| 2007/0033374 A1 | 2/2007 | Sinclair et al. | |
| 2007/0083697 A1 | 4/2007 | Birrell et al. | |
| 2007/0113001 A1 | 5/2007 | Yamada | |
| 2007/0143531 A1 | 6/2007 | Atri | |
| 2007/0174549 A1 | 7/2007 | Gyl et al. | |
| 2007/0300037 A1 | 12/2007 | Rogers et al. | |
| 2008/0235306 A1 | 9/2008 | Kim et al. | |
| 2008/0282023 A1 | 11/2008 | Biswas et al. | |
| 2008/0282024 A1 | 11/2008 | Biswas et al. | |
| 2008/0282025 A1 | 11/2008 | Biswas et al. | |
| 2008/0282045 A1 | 11/2008 | Biswas et al. | |

OTHER PUBLICATIONS

Gal et al. (Jun. 2005) "Algorithms and Data Structures for Flash Memories"; ACM Computing Surveys; 37(2): 138-163.

Manning et al. (Feb. 2002) "YAFFS (Yet Another Flash File System)"; HTTP://WWW.YAFFS.NET, 15 Pages.

Kang et al. (Oct. 22025, 2006) "A Superblock-Based Flash Translation Layer for NAND Flash Memory"; ACM; EMSOFT '06; Seoul, Korea; pp. 161-170.

Mathur et al. (2006) "Capsule: An Energy-Optimized Object Storage System for Memory Constraigned Sensory Devices"; ACM; SENSYS '06.

Kim et al. (1999) "A New Flash Memory Management for Flash Storage System"; IEEE; COMPSAC '99.

Gay (2003) "Design of Matchbox, The Simple Filing System for Motes"; WWW.TINYOS.NET/TINYOS-1.X/DOC/MATCHBOX-DESIGN.PDF.

Hill (2003) "System Architecture for Wireless Sensor Networks"; Univ. of California, Berkeley.

* cited by examiner

WEAR LEVELING IN STORAGE DEVICES BASED ON FLASH MEMORIES AND RELATED CIRCUIT, SYSTEM, AND METHOD

PRIORITY CLAIM

The present application is a divisional application of U.S. patent application Ser. No. 12/075991, filed May 9, 2007, which application is incorporated herein in its entirety.

CROSS REFERENCE TO RELATED APPLICATIONS

This application is related to U.S. patent application Ser. Nos. 11/801,687 filed May 9, 2007, entitled RESTORING STORAGE DEVICES BASED ON FLASH MEMORIES AND RELATED CIRCUIT, SYSTEM, AND METHOD, Ser. No. 11/801,742 filed May 9, 2007, entitled MANAGEMENT OF ERASE OPERATIONS IN STORAGE DEVICES BASED ON FLASH MEMORIES, and Ser. No. 11/801,745 filed May 9 2007 entitled GARBAGE COLLECTION IN STORAGE DEVICES BASED ON FLASH MEMORIES, which have a common filing date and owner and which are incorporated by reference.

TECHNICAL FIELD

An embodiment of the present disclosure relates to the storage device field. More specifically, an embodiment of the present disclosure relates to wear leveling in storage devices based on flash memories.

BACKGROUND

Storage devices based on flash memories have become very attractive in the last years; for example, they are commonly used as mass memories (also known as solid-state mass memories) in several data processing systems. These storage devices are compact, robust and with low power consumption; therefore, they may be advantageous, especially in portable systems (such as mobile telephones), which are typically supplied by batteries.

Typically, flash memories used to implement the above-mentioned storage devices can be erased only in blocks having a relatively large size (for example, 16-32 Kbytes). Therefore, once data has been written into the flash memory, this data cannot be updated unless the corresponding whole block is erased. In order to emulate operation of a random access device (such as a standard hard-disk), a translation layer is provided on top of the flash memory. The translation layer manages any update of the data stored in the flash memory by writing a new version thereof in a different area of the flash memory, and at the same time updating corresponding mapping information.

A problem with some storage devices based on flash memories is that the number of times each block can be erased is intrinsically limited, for example, on the order of 100,000-300,000 times. Indeed, every erasing of the block physically wears its memory cells. As a result, as time goes on more time is required to erase the memory cells, sporadic faults may appear when they are programmed, and the capability of distinguishing between different conditions (e.g., storing a "0" or a "1") thereof lessens; in the end, the block may entirely lose the ability of being erased, thereby becoming unusable (or bad). This limited endurance to the erasures of the blocks reduces the lifetime of the storage devices.

In order to alleviate the above-described problem, wear leveling techniques have been proposed. The wear leveling techniques are aimed at distributing the number of erasures of the blocks uniformly throughout the whole flash memory. In this way, all the blocks should approach the number of their allowable erasures; as a result, the lifetime of the memory device theoretical tends towards its maximum value.

For example, an approach that has been proposed is of selecting the blocks to be used for writing data with a random algorithm; statistically, the blocks should then be erased with a similar frequency.

As a further improvement, US-A-2006/0155917 (the entire disclosure of which is herein incorporated by reference) discloses a solution that is based on a table storing the number of erasures of each block of the flash memory; the table is used to create a list, which orders the erased blocks (being available to be used for writing data) according to their number of erasures. In this way, whenever an erased block must be used for writing data, it is possible to select the one with the lowest number of erasures; the selected block is likely to be erased again later on, so as to increase the uniformity of the distribution of the erasures.

However, the solutions known in the art may not be completely satisfactory in some applications. Indeed, the available wear-leveling techniques are often ineffective in obtaining an actual uniform distribution of the erasures of the blocks in the flash memory.

Therefore, in many practical situations it may be that the erasures concentrate on some blocks only. As a result, those blocks may become unusable in a relatively short time, while other blocks are subject to a far lower number of erasures. Unfortunately, this may have detrimental effect on the lifetime of the whole memory device.

SUMMARY

In its general terms, an embodiment the present disclosure is based on is the idea of extending the application of the wear-leveling process to more blocks of the flash memory.

More specifically, an embodiment of the disclosure proposes a wear-leveling method for use in a storage device based on a flash memory. The flash memory includes a plurality of physical blocks, which are adapted to be erased individually. The method starts with the step for erasing one of the physical blocks. One of the physical blocks being allocated for storing data is selected; this operation is performed in response to the reaching of a threshold by an indication of a difference between a number of erasures of the erased physical block and a number of erasures of the selected physical block. At least the data of the selected physical block being valid is copied into the erased physical block. The selected physical block is then erased.

In an embodiment of the disclosure, the method is applied during a garbage collection procedure (wherein a physical block of the root type and one or more physical blocks of the child type are compacted into a single physical block of the root type).

In an embodiment, only the valid data of the selected physical block is copied into the erased physical block.

The threshold may be set to a percentage (for example, 30%-70%) of an allowable range of an aging index representing the number of erasures of each physical block.

In a proposed implementation, only a youngest allocated physical block (being subject to the lowest number of erasures) is taken into account for the selection of the allocated physical block to be used to replace the erased physical block.

Alternatively, the selection may be performed (among a set of allocated physical blocks being eligible to this purpose) according to a preference criteria based on one or more characteristics thereof.

For example, it is possible to select the youngest eligible allocated physical block of a child type (when available).

This result may be achieved by means of a list, which orders the allocated physical blocks according to the corresponding number of erasures.

In an implementation of the disclosure, the flash memory is of the NAND type.

Another embodiment of the disclosure proposes a software program for performing the method.

A further embodiment of the disclosure proposes a control system for a storage device.

A still further embodiment of the disclosure proposes a corresponding storage device.

Moreover, another embodiment of the disclosure proposes a data processing system including one or more storage devices.

BRIEF DESCRIPTION OF THE DRAWINGS

One or more embodiments of the disclosure, as well as further features and the advantages thereof, will be best understood with reference to the following detailed description, given purely by way of a non-restrictive indication, to be read in conjunction with the accompanying drawings.

DETAILED DESCRIPTION

Figure 1:
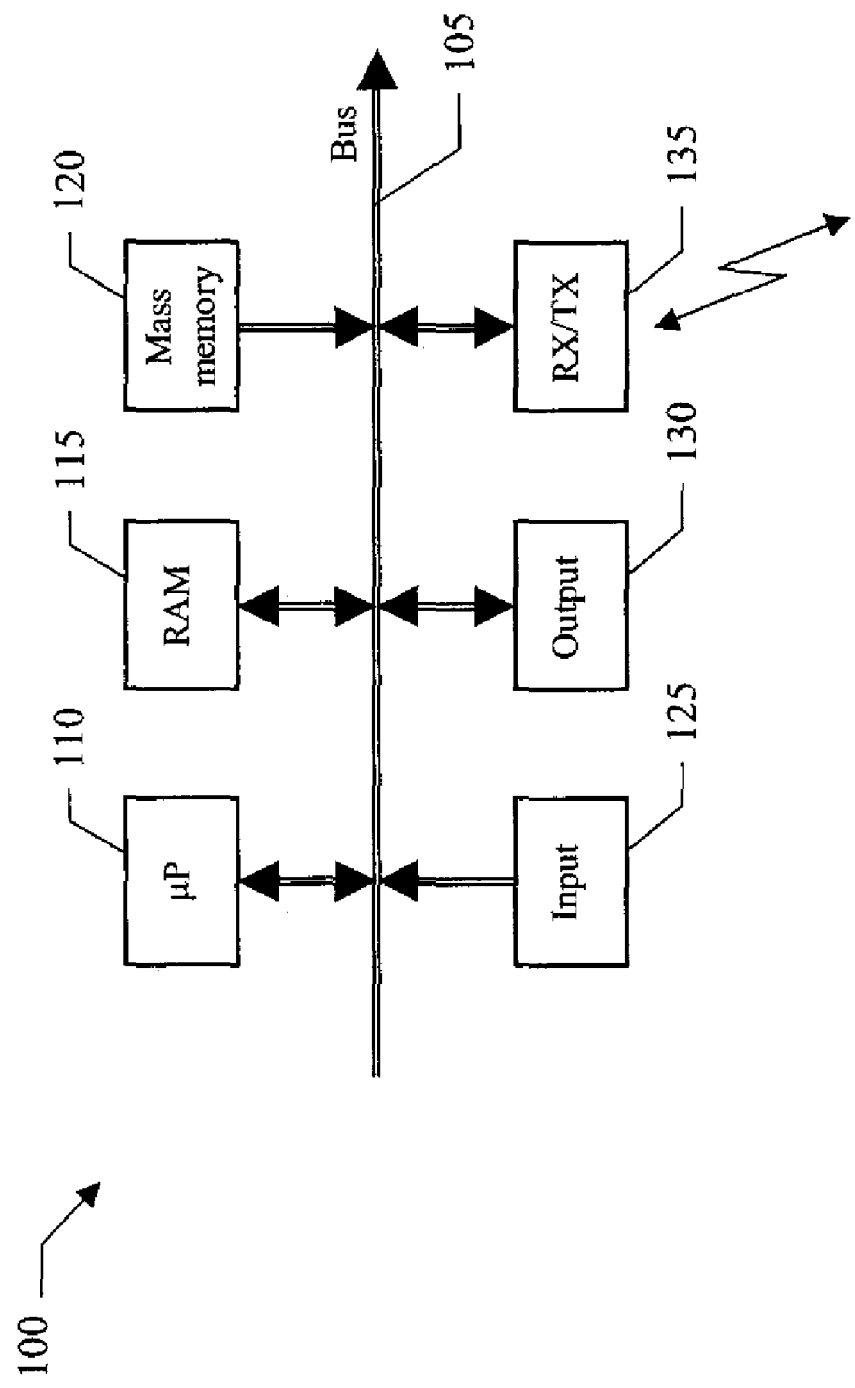
FIG. 1 is a schematic block diagram of a mobile telephone wherein the solution according to an embodiment of the disclosure can be practiced.

With reference now to FIG. 1, a mobile telephone 100 is illustrated. The telephone 100 is formed by several units that are coupled in parallel to a communication bus 105. In detail, a microprocessor (μP) 110 controls operation of the telephone 100; a RAM 115 is directly used as a working memory by the microprocessor 110. Several peripheral units are further coupled to the bus 105 (through respective drives). Particularly, a storage device 120 implements a solid-state mass memory; the storage device 120 is used to store data that should be preserved even when a power supply of the telephone 100 is off (for example, firmware for the microprocessor 110, application programs, and personal information of a user of the telephone 100 such as an address book). Moreover, the telephone 100 includes input units 125 (for example, a keypad, a microphone, and a camera), and output units 130 (for example, a display and a loudspeaker). A transceiver (RX/TX) 135 implements any communications with a telephone exchange (not shown in the figure) to send and receive information.

Figure 2A:
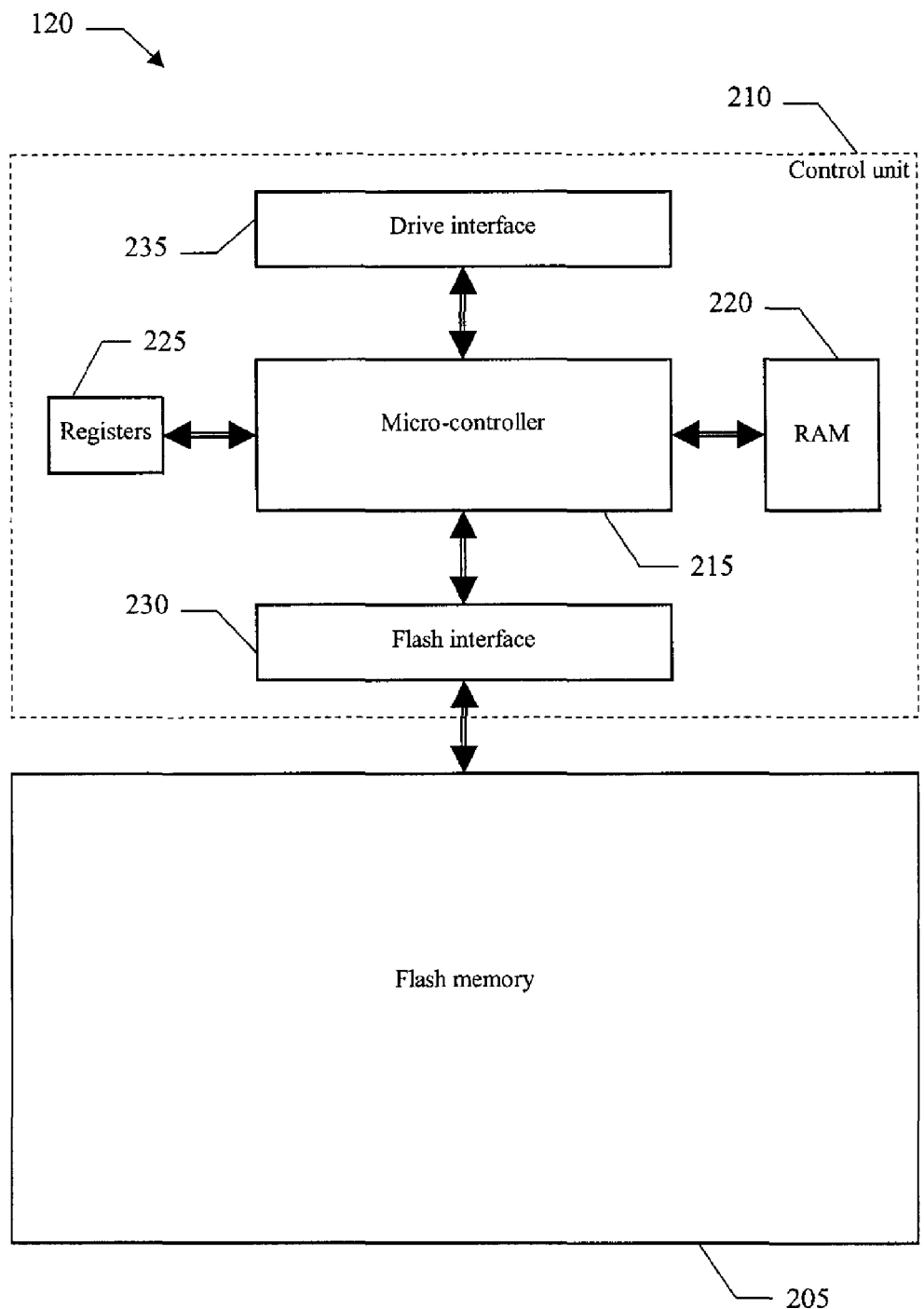
FIG. 2A is a high-level representation of an embodiment of a storage device included in the telephone.

Passing now to FIG. 2A, the storage device 120 is based on a flash memory 205. The flash memory 205 includes a matrix of memory cells with NAND architecture (not shown in the figure). The flash memory 205 programs and reads the memory cells at the level of physical pages (for example, each one consisting of 528 bytes). On the other hand, the memory cells are erased at the level of far larger physical blocks (for example, each one including 32 physical pages). Therefore, once a physical page has been programmed (so as to write the desired data into it), this physical page cannot be updated any longer—unless the whole respective physical block is erased (or the update involves only the further programming of its memory cells).

A control unit 210 manages the flash memory 205 so as to emulate a random access to the storage device 120. The control unit 210 is based on a micro-controller 215. The micro-controller 215 accesses a RAM 220 (being used as a working memory) and a series of registers 225. An interface 230 couples the micro-controller 215 with the flash memory 205; another interface 235 instead couples the same micro-controller 215 with the driver (not shown in the figure) of the telephone for the storage device 120.

Operation of the micro-controlled 215 is managed by firmware, which is stored in the flash memory 205 and then loaded (at least partially) into the RAM 220 when the micro-controller 215 is running; the firmware is initially installed onto the flash memory 205 during a manufacturing process of the storage device.

Figure 2B:
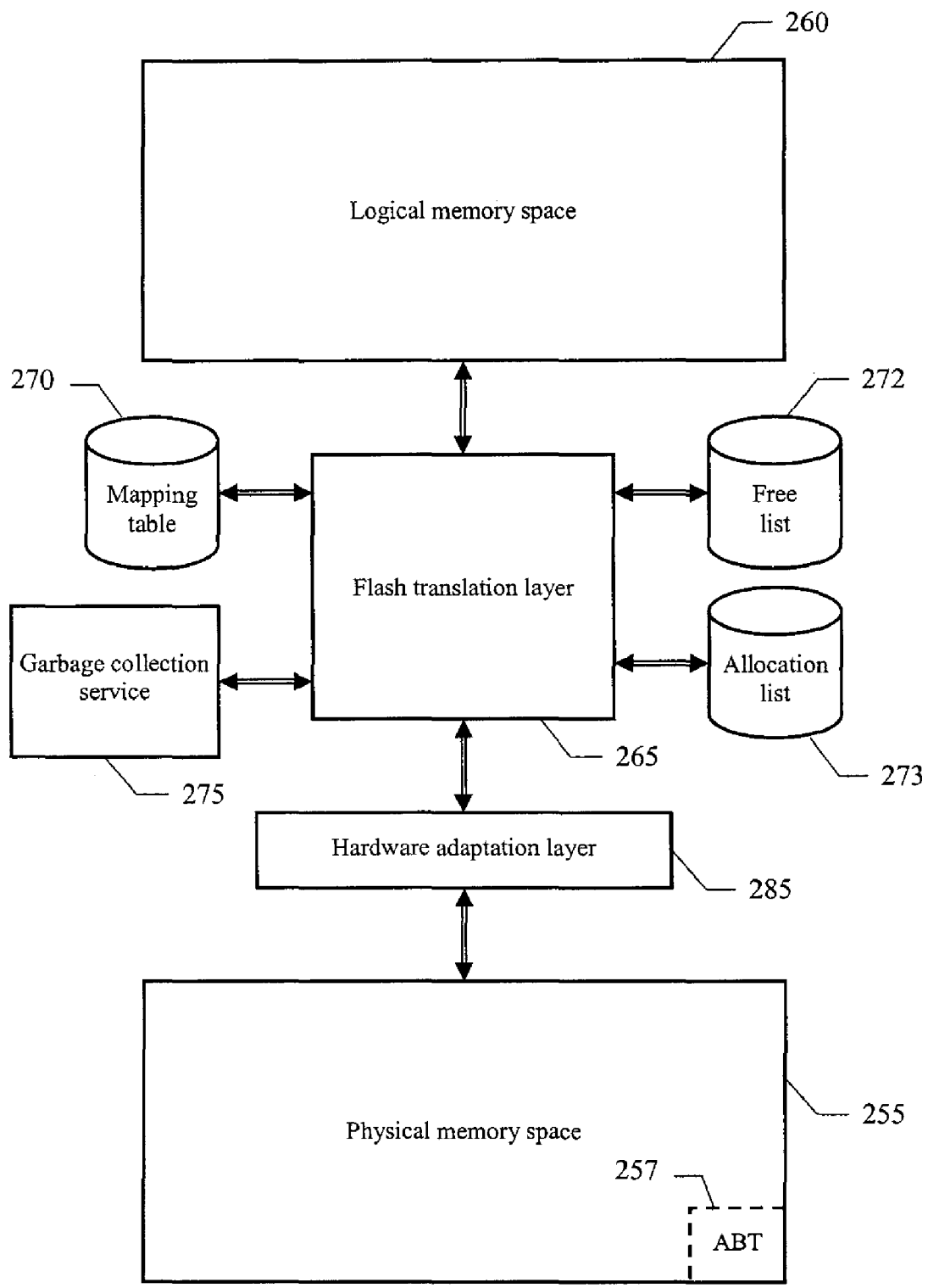
FIG. 2B is an embodiment of a functional scheme of the storage device.

A functional scheme of the same storage device is illustrated in FIG. 2B. The flash memory provides a physical memory space 255. The physical memory space 255 includes its physical blocks, which can be erased individually; each physical block is identified by a corresponding physical block number (for example, of 12 bits for accessing up to 4096 physical blocks). In turn, each physical block includes its physical pages, which can be programmed (only once for each memory cell) and read individually; each physical page is identified by a corresponding physical offset within the physical block (of 4 bits in the example at issue, wherein each physical block includes 32 physical pages).

The storage device 120 emulates a logical memory space 260. The logical memory space 260 includes logical sectors (for example, each one of 512 bytes), which can be written (repeatedly to any value) and read individually. The logical sectors are grouped into logical blocks (for example, each one including 32 logical sectors). Each logical block is identified by a corresponding logical block number (for example, again of 12 bits for accessing up to 4096 logical blocks); each logical sector is identified by a corresponding logical offset within the logical block (of 4 bits in the example at issue). The different versions of the logical sectors are written into corresponding physical sectors (each physical sector typically including a single physical page). The physical sector includes a main area for storing the value of the logical sector and a spare area for storing service information (i.e., 512 bytes and 16 bytes, respectively, in the example at issue).

One of the physical blocks is dedicated to store an Aging Block Table (ABT) 257; for example, the aging block table 257 is stored in the last physical block of the physical memory space 255 that is available (i.e., being not bad). For each physical block, the aging block table 257 stores an aging index indicating the number of erasures of the physical block; the aging indexes of all the physical blocks are stored in succession in the main areas of multiple physical sectors (with the aging index of each physical block being stored in the position corresponding to its physical block number). For example, each aging index is represented with two bytes; therefore, in the example at issue (wherein the physical memory space 255 includes 4096 physical blocks and each physical sector has a main area of 512 bytes), the aging block table 257 is stored in (4096*2)/512=16 physical sectors of the corresponding physical block. Each physical sector used to store the aging block table 257 is identifying by means of a corresponding aging flag, which is written in its spare area; typically, the aging flag consists of a specific bit that is asserted for the physical sectors storing the aging block table 257 (while it is deasserted for the other physical sectors). In this way, the aging flag of the first physical sector of the different physical blocks may also be used to identify the one storing the aging block table 257 (when it is asserted). Typically, all the aging indexes are set to 1 every time the flash memory is formatted (with all its physical blocks that are erased). Whenever the aging block table 257 must be updated, its new version is written into the next 16 physical sectors of the same physical block if available; when this physical block is full, it is erased and the aging block table 257 is then written into its first 16 physical sectors.

A Flash Translation Layer (FTL) 265 maps the logical memory space 260 onto the physical memory space 255. Particularly, each logical block is associated with one or more physical blocks (organized into a tree structure); in a specific implementation, the logical block is associated with a physical block that defines a root node, and possibly with another physical block that defines a leaf node (depending on the root node). The logical sectors of the logical block are written in succession into consecutive physical sectors of the associated physical block(s); the writing of the logical sectors starts from the root physical block, and then continues to the leaf physical block once the root physical block is full. Since the physical sectors can be programmed only once, any time a logical sector must be updated its new version is written into another physical sector. When a logical sector is written into a physical sector, its value is stored in the main area of the physical sector; the spare area instead stores an indication of the corresponding logical sector (for example, its logical offset). The spare area of the first physical sector of each physical block is also used to store an indication of the corresponding logical block (for example, its logical block number), and an indication of the position of the physical block in the tree structure (i.e., root node or leaf node).

The translation layer 265 manages a Logical-to-Physical (L2P) mapping table 270. The mapping table 270 associates each logical block with its root physical block and leaf physical block (if any); in turn, the mapping table 270 associates each written logical sector with the physical sector (in the root physical block or in the leaf physical block) wherein its last version is stored. The mapping table 270 is created—at least partially—during an initialization of the storage device at its power-on (by reading the relevant information stored in the spare areas of the different physical sectors); the mapping table 270 is then maintained up-to-date according to the operations performed on the storage device.

The translation layer 265 also manages a free list 272. The free list 272 indicates the physical blocks that are erased and then available to write data (by means of their physical block numbers), together with the corresponding aging indexes; the erased physical blocks are arranged in the free list 272 in increasing order of their aging indexes—starting from a youngest erased physical block with the lowest aging index (i.e., being subject to the lowest number of erasures). As above, the free list 272 is created during the initialization of the storage device at its power-on (by reading the aging block table 257). The free list 272 is then maintained up-to-date according to the operations performed on the storage device.

The maximum allowable value of each aging index depends on the number of bits being used for storing it; in the example at issue, the aging index can span a range from 0 to $2^{16}-1=65,535$. In order to avoid any overflow, once a generic aging index reaches its maximum allowable value (i.e., 65,535) all the aging indexes are divided by two.

The information stored in the free list 272 (i.e., the updated aging indexes of the erased physical blocks) is merged with the content of the aging block table 257 (storing the previous aging indexes of all the physical blocks)—for example, after a predefined number of erasures; the new version of the aging block table 257 so obtained is then written back to the corresponding physical block (by previously erasing it when necessary).

The translation layer 265 exploits the free list 272 to implement a wear leveling algorithm. For this purpose, whenever an erased physical block must be used for writing data, the translation layer 265 selects the first erased physical block in the free list 272 (i.e., the youngest erased physical block with the lowest aging index); the erased physical block so selected is then removed from the free list 272 (with the next erased physical block having the aging index just higher than becomes the new first erased physical block in the free list 272).

The structure of the aging block table 257 and of the free list 272, together with the corresponding wear leveling algorithm are described in greater detail in the above mentioned document US-A-2006/0155917.

The solution according to an embodiment of the present disclosure is based on the observation that the number of erasures of the physical blocks strongly depends on an access pattern to the data stored therein. Indeed, the data stored in some physical blocks may be highly dynamic (i.e., it changes continually). Therefore, the physical blocks storing dynamic data are erased very shortly after they have been written—so as to become part of the wear leveling algorithm. Conversely, data stored in different physical blocks may be substantially static (i.e., it changes very seldom once it has been written). In this case, the physical blocks storing static data may be not erased for a long time; therefore, these physical blocks are not taken into account by the wear leveling algorithm (until they are erased).

In the solution proposed in an embodiment of the present disclosure, as described in detail in the following, whenever a physical block is erased a search is performed for any (younger) written physical block with a far lower number of erasures; particularly, one of the written physical blocks is selected when the difference between the number of erasures of the erased physical block and the number of erasures of the selected physical block (i.e., the difference between their aging indexes) reaches a predefined threshold value. In this case, the data stored in the selected physical block (or at least the valid one) is copied into the erased physical block. The selected physical block is then erased.

As a result, the selected physical block replaces the erased physical block. Therefore, the selected physical block becomes part of the wear leveling algorithm (being inserted into the free list 272 after its erasing). Generally, the selected physical block is placed at the beginning of the free list 272 (being its number of erasures very low), so that it should be used to write data shortly (and then probably erased again).

The proposed technique makes it possible to erase even the physical blocks that store static data. In this way, all the physical blocks are taken into account by the wear leveling algorithm. Therefore, the obtained distribution of the number of erasures of the physical blocks is far less dependent on the access pattern to the data stored in the physical blocks.

This may strongly increase the uniformity of the distribution of the erasures of the physical blocks in the flash memory.

It is then possible to reduce any concentration of the erasures on some physical blocks only (like the physical blocks storing data that is highly dynamic).

In this way, the number of erasures of all the physical blocks may tend to approach their maximum allowable value.

This may have a beneficial impact on the lifetime of the whole memory device.

In a suggested implementation of the solution according to an embodiment of the present disclosure, the threshold value is set according to the range of the aging index. For example, the threshold value is equal to 30%-70%, 40%-60%, or 50%, the range of the aging index. Therefore, in the example at issue (wherein the range of the aging index is 0-65,535) the threshold value may be set to 32,768. The proposed threshold value is anticipated to provide very good results (in terms of uniformity of the distribution of the erasures) with an acceptable overhead of the storage device (for the operations required to replace the erased physical block with the selected physical block).

For this purpose, the translation layer 265 may exploit an allocation list 273. The allocation list 273 indicates the physical blocks that are written (by means of their physical block numbers), together with the corresponding aging indexes; the written physical blocks are arranged in the allocation list 273 in increasing order of their aging indexes—starting from a youngest written physical block with the lowest aging index (i.e., being subject to the lowest number of erasures). As above, the allocation list 273 is created during the initialization of the storage device at its power-on (by reading the aging block table 257). The allocation list 273 is then maintained up-to-date according to the operations performed on the storage device.

The translation layer 265 also interfaces with a service 275 that implements a garbage collection procedure. When the garbage collection service 275 is invoked for a specific logical block (for example, because both the root physical block and the leaf physical block associated with the logical block are full, so that no further writing can be performed on its logical sectors), the root and leaf physical blocks are compacted into a new root physical block.

The translation layer 265 controls the physical memory space 255 through a hardware adaptation layer 285. The adaptation layer 285 exports a command interface for reading/programming the physical pages and for erasing the physical blocks of the flash memory. The adaptation layer 285 implements different functions that are required to access the flash memory (such as a low level driver of the flash memory, an ECC manager, a bad blocks manager, and the like).

An exemplary application of the solution according to an embodiment of the present disclosure during the above-mentioned garbage collection procedure will be now described with reference to FIG. 3A-3C.

Figure 3A:
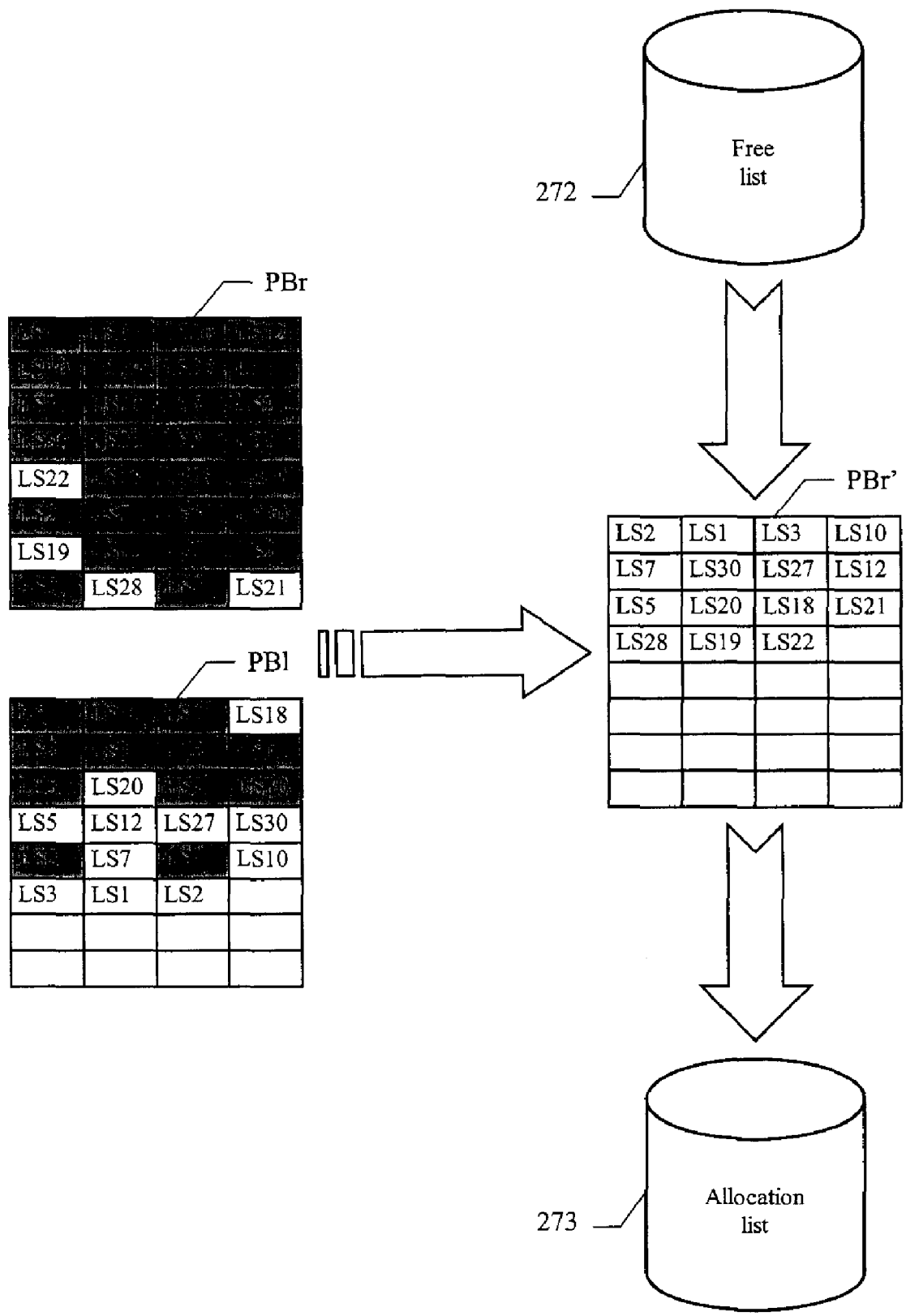
FIGS. 3A-3C show an exemplary application of the solution according to an embodiment of the disclosure.

Particularly, as shown in FIG. 3A, let us consider a generic logical block that is stored in a root physical block (denoted with PBr) and a leaf physical block (denoted with PBl). The different versions of the corresponding logical sectors (denoted with LSi, i=0 . . . 31) have been written in succession into consecutive physical sectors of the root physical block PBr and then of the leaf physical block PBl (after its completion). The last version of each logical sector LSi is shown in the corresponding physical sector PBr,PBl with a white background; the proceeding versions thereof (not valid any longer) are instead shown with a gray background. For example, the logical sector LS1 has been written at the beginning into the $1^{st}$ physical sector of the root physical block PBr (starting from the upper left corner and then moving from left to right along each row, down to the lower right corner); next versions of the same logical sector LSi have been written into the $16^{th}$ and the $27^{th}$ physical sectors of the root physical block PBr, and then into the $1^{st}$, the $3^{rd}$, the $6^{th}$, the $11^{th}$, and the $19^{th}$ physical sectors of the leaf physical block PBl. The last version of the logical sector LSi has been written into the $22^{nd}$ physical sector of the leaf physical block PBl.

When the logical block is compacted, the first erased physical block (i.e., the youngest one with the lowest aging index) is extracted from the free list 272 for use as its new root physical block (differentiated with a prime notation, i.e., PBr'); the new root physical block PBr' is then removed from the free list 272. The last versions of the logical sectors LSi are now copied from the (old) root physical block PBr and leaf physical block PBl into the new root physical block PBr'. For this purpose, the old physical blocks PBr,PBl are scanned backward (from the end of the old leaf physical block PBl to the beginning of the old root physical block PBr). Each encountered logical sector LSi is copied into the first available physical sector of the new root physical block PBr' when it is not present yet in PBr' (being the latest version thereof), while it is discarded otherwise (being a previous version thereof). At the end, the last versions of all the logical sectors LSi stored in the old physical blocks PBr,PBl will be written in the new root physical block PBr' (at most filling it). In this phase, the spare area of each physical sector of the new root physical block PBr' being programmed is set accordingly. Particularly, the spare area of the first physical sector of the new root physical block PBr' will store the indication that it is the root node for the corresponding logical block. At the same time, the mapping table is updated accordingly (so as to associate the logical block with the new root physical block PBr', and each written logical sector LSi thereof with the corresponding physical sector of the new root physical block PBr'). The new root physical block PBr' is then inserted into the allocation list 273, in the correct position according to its aging index.

Figure 3B:
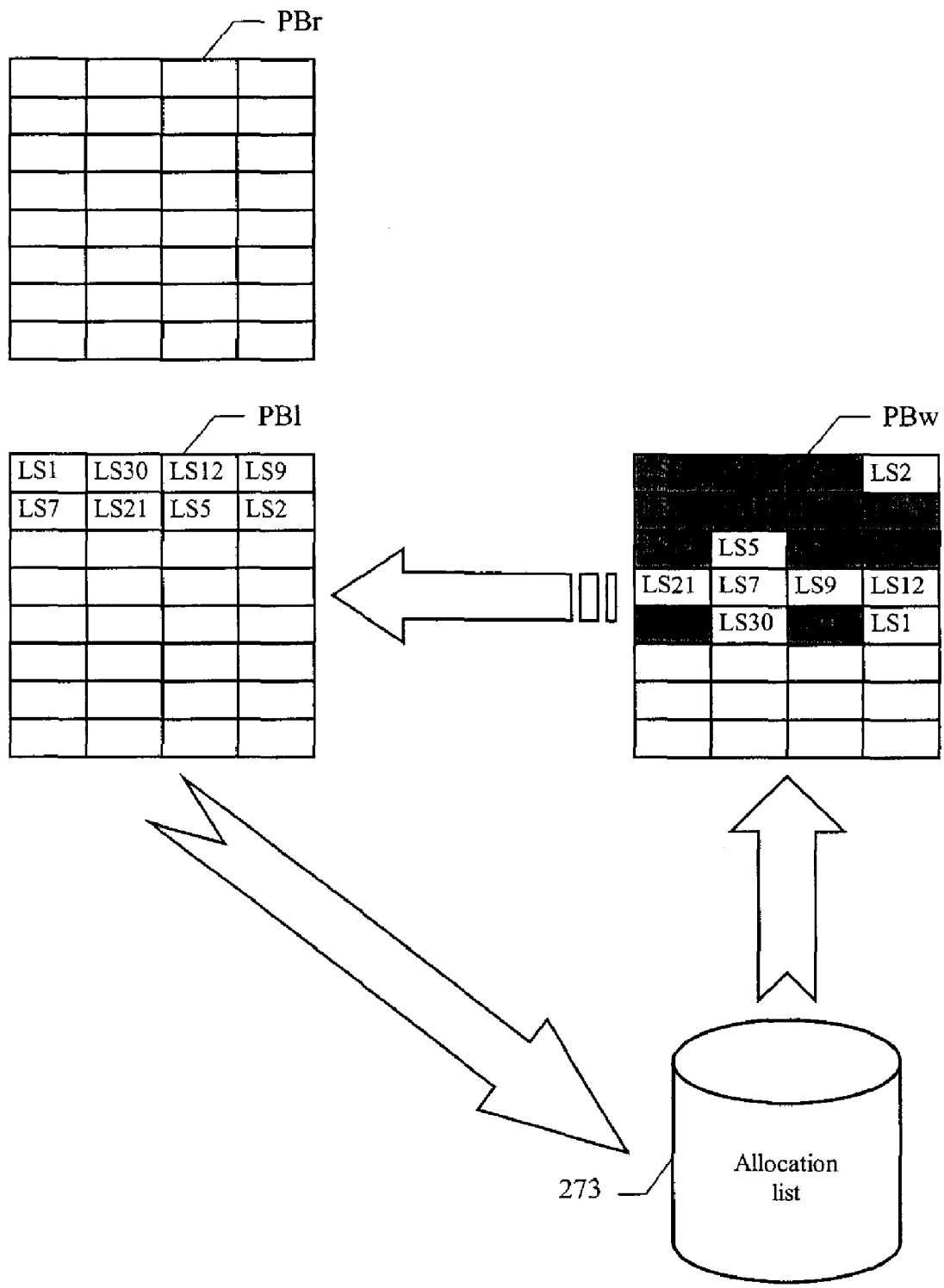

Moving to FIG. 3B, the old physical blocks PBr,PBl are erased; the old physical blocks PBr,PBl are then removed from the allocation list 273. The wear leveling algorithm is then applied to the erased (old child) physical block PBl. For this purpose, as described in detail in the following, the aging index of the erased physical block PBl (obtained by incrementing its previous value) is compared with the aging indexes of the written physical blocks. When no far younger written physical block is found—with the difference between the aging index of the erased physical block PBl and the aging index of each written physical block not reaching the threshold value—the erased physical block PBl is inserted as usual into the free list (not shown in the figure) in the correct position according to its aging index. Conversely, when a far younger written physical block (denoted with PBw) is found, the last versions of the logical sectors stored in the written physical block PBw (again denoted with LSi) are copied into the erased physical block PBl. In the example illustrated in the figure, this involves copying the physical sectors LS1, LS30, LS12, LS9, SL7, SL21, LS5 and LS2 from the $20^{th}$, $18^{th}$, $16^{th}$, $15^{th}$, $14^{th}$, $13^{th}$, $10^{th}$ and $4^{th}$ physical sectors, respectively, of the written physical block PBw into the first eight physical sectors of the physical block PBl (being not erased any longer). In this phase, the spare area of each physical sector of the physical block PBl being programmed is set accordingly. Moreover, the information relating to the physical block PBl (stored in the spare area of its first physical sector) is copied from the corresponding information of the written physical block PBw; particularly, the physical block PBl is identified as a root node or a leaf node (like the written physical block PBw) for the same logical block. At the same time, the mapping table is updated accordingly (so as to associate the logical block with the physical block PBl, and each written logical sector LSi thereof with the corresponding physical sector of the physical block PBl). The physical block PBl is then inserted into the allocation list 273, in the correct position according to its aging index.

Figure 3C:
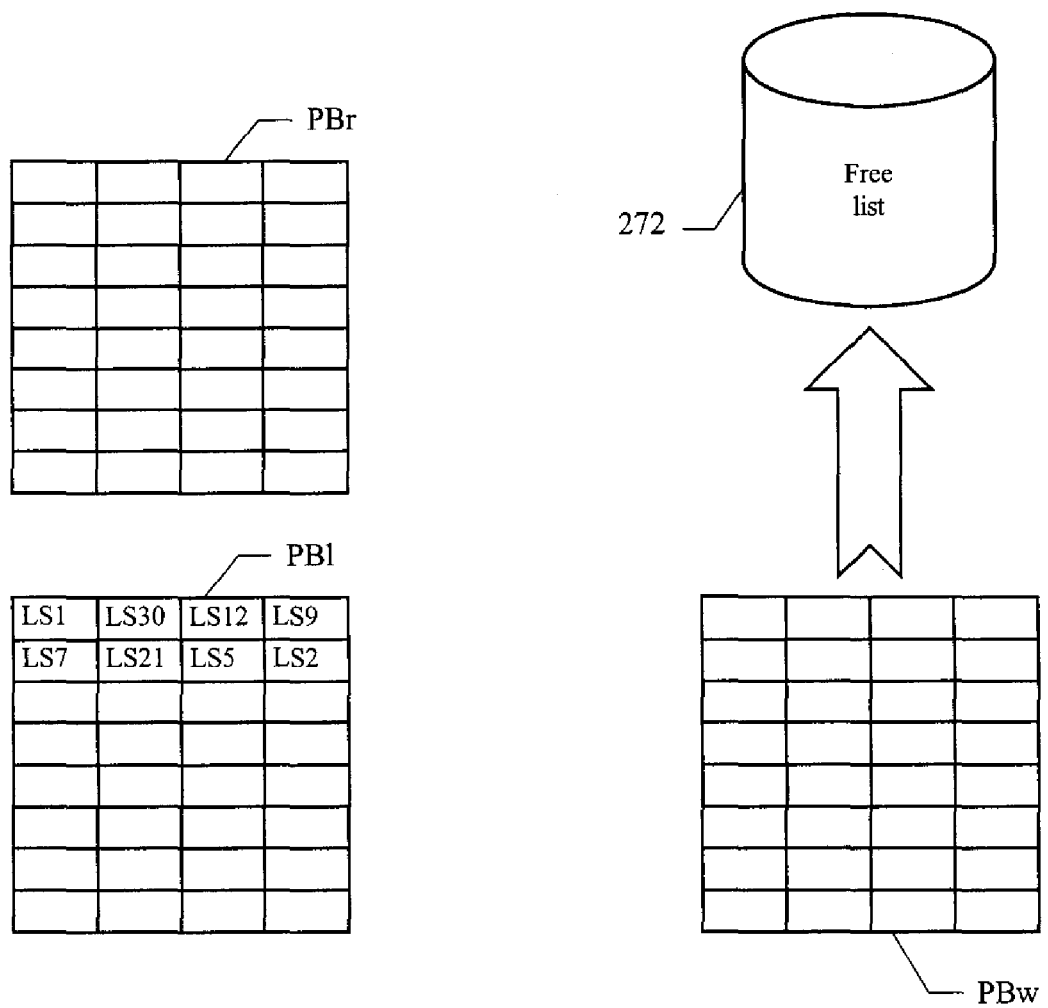

Passing to FIG. 3C, the written physical blocks PBw is erased; the physical block PBw (now erased) is removed from the allocation list (not shown in the figure). The physical block PBw is then inserted into the free list 272; the physical block PBw is arranged in the correct position according to the aging index, which is obtained by incrementing its previous value. The wear leveling algorithm is then applied to the (erased) old root physical block PBr; this involves repeating the same operations described above (which explanation is omitted for the sake of brevity).

The use of the allocation list 273 (for selecting the written physical block to be used to replace the erased physical block) according to different embodiments of the present disclosure will be now described with reference to FIGS. 4A-4C.

Figures 4A, 4B, 4C:
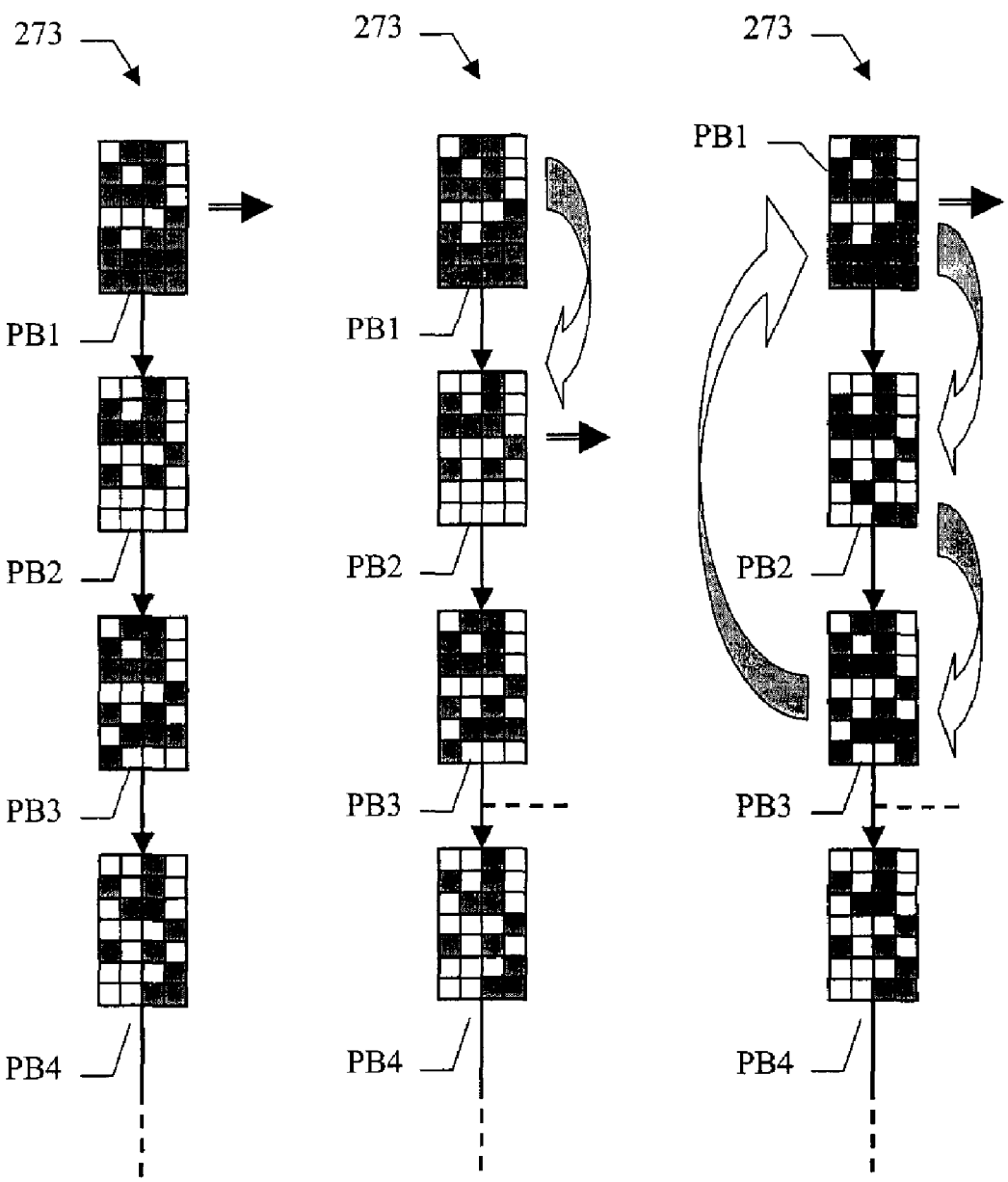
FIGS. 4A-4C illustrate a possible implementation of the solution according to an embodiment of the disclosure.

Particularly, FIG. 4A shows the allocation list 273, wherein the written physical blocks are ordered starting from the youngest written physical block (at the top) and moving down to the other written physical blocks (with increasing aging indexes); in the figure, the written physical blocks are denoted with the reference PB, being followed by an index indicating their position in the allocation list 273 (starting from 1 for the youngest written physical block PB1).

In a proposed embodiment of the disclosure, the aging index of the erased physical block is only compared with the aging index of the youngest written physical block PB1 (at the beginning of the allocation list 273). When the difference between the aging index of the erased physical block and the aging index of the youngest written physical block PB1 is higher than the threshold value, the youngest written physical block PB1 is selected for replacing the erased physical block (as indicated by a corresponding arrow in the figure). Conversely, no written physical block will be selected (since all the aging indexes of the other written physical blocks are higher, so that the same difference will be lower). In this case, the allocation list 273 may be replaced with a simple register, which only indicates the youngest written physical block, together with its aging index (since the information about the other written physical blocks is never used).

This solution is simple and fast; moreover, it may be implemented with a very low waste of working memory space (when the above-mentioned register is used).

Moving to FIG. 4B, in a different embodiment of the disclosure the selection of the written physical block to be used to replace the erased physical block is performed among all the written physical blocks that are eligible for this purpose (i.e., with the difference between the aging index of the erased physical block and the aging index of each eligible written physical block that is higher than the threshold value). In the example at issue, the eligible (written) physical blocks are the first three physical blocks PB1, PB2 and PB3 of the allocation list 273 (as indicated by a dashed line).

In this case, the first eligible physical block PB1-PB3 (along the allocation list 273) that is selected is of the leaf type; this result may be achieved by scanning the allocation list 273 until a leaf eligible physical block is found. For example, as shown in the figure, the eligible physical block PB1 is of the root type and the eligible physical blocks PB2, PB3 are of the leaf type; therefore, the (leaf) eligible physical block PB2 is selected—even if its aging index is slightly higher that the one of the (root) eligible physical block PB1.

Anyway, as shown in FIG. 4C, when all the eligible physical blocks (again including the physical blocks P1-P3) are of the root type, the youngest physical block PB1 is selected as above. This happens when the scanning of the allocation list 273 reaches a physical block that is not eligible (i.e., the physical block PB4) without finding any eligible physical block of the leaf type; in this case, the wear leveling algorithm returns to the beginning of the allocation list 273.

This solution allows selecting a written physical block that generally includes a lower number of last versions of the corresponding logical sectors. As a result, the number of logical sectors to be copied from the selected physical block to the erased physical block may be reduced (at least statistically); this may have a beneficial effect on the performance of the wear leveling algorithm (since the time spent for selecting the written physical block among the eligible ones is negligible).

Figure 5:
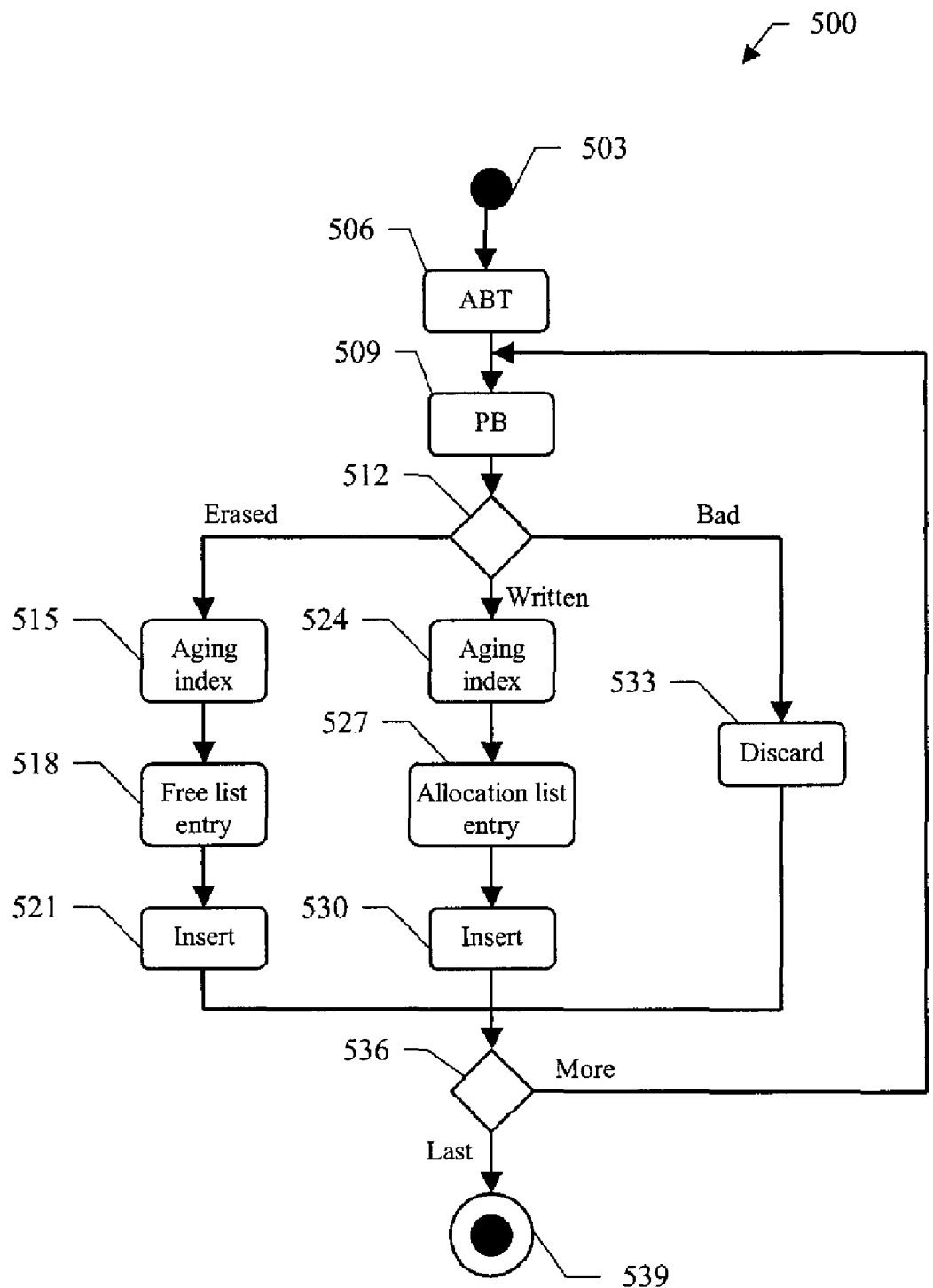
FIGS. 5-6 are diagrams describing the flow of activities relating to an implementation of the solution according to an embodiment of the disclosure.

With reference now to FIG. 5, the logic flow of an exemplary procedure that can be implemented to initialize the above-described storage device at its power-on is represented with a method 500.

The method begins at the black start circle 503, and then passes to block 506. In this phase, the aging block table is searched by scanning the physical blocks of the flash memory backwards (starting from the last one); as soon as the physical block storing the aging block table is found (as indicated by the aging flag of its first physical sector being asserted), the last version thereof is loaded.

A loop is then performed for each other physical block of the flash memory. The loop starts at block 509, wherein the service information of a current physical block—starting from the first one—is retrieved (from the spare area of its first physical sector).

The method then branches at block 512 according to the condition of the (current) physical block. Particularly, if the physical block is erased the blocks 515-521 are executed, if the physical block is written the blocks 524-530 are executed, and if the physical block is bad the block 533 is executed; in any case, the method then passes to block 536.

Considering now block 515, this branch is followed when the physical block is identified as erased (for example, when a corresponding flag in the spare area of its first physical sector is asserted); in this case, the aging index of the (erased) physical block is extracted from the aging block table, by accessing the location corresponding to its physical block number. A new entry for the free list is then created at block 518 by adding the relevant information of the erased physical block (i.e., its physical block number and aging index). Continuing to block 521, this entry is inserted in the correct position into the free list, according to the aging index of the erased physical block. The flow of activity then descends into block 536.

With reference instead to block 524, this branch is followed when the physical block is identified as written (for example, when a corresponding flag in the spare area of its first physical sector is asserted); as above, the aging index of the (written) physical block is extracted from the aging block table, by accessing the location corresponding to its physical block number. A new entry for the allocation list is then created at block 527 by adding the relevant information of the written physical block (i.e., its physical block number and aging index). Continuing to block 530, this entry is inserted in the correct position into the allocation list, according to the aging index of the written physical block. The flow of activity then descends into block 536.

At the end, the block 533 is entered when the physical block is identified as bad (for example, when present in a corresponding list); in this case, the (bad) physical block is discarded. As above, the flow of activity then descends into block 536.

Considering now block 536, a test is made to verify whether all the physical blocks of the flash memory have been processed. If not, the method returns to block 509 to repeat the same operations for a next physical block. Conversely, the process ends at the concentric white/black stop circles 539.

Figure 6:
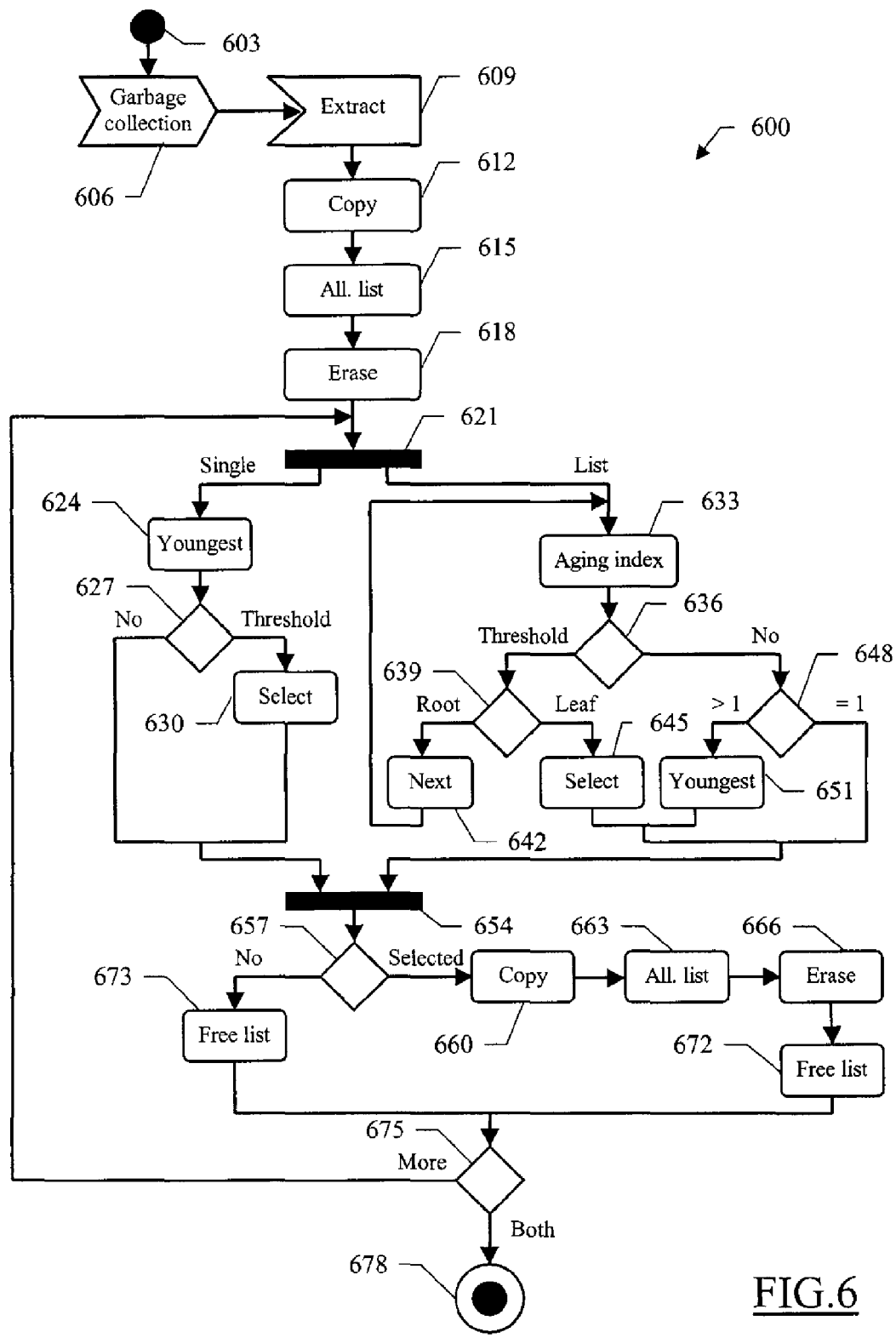

Moving now to FIG. 6, the logic flow of an exemplary wear leveling algorithm that can be implemented in the same storage device is represented with a method 600.

The method begins at the black start circle 603, and then passes to block 606. As soon as a garbage collection procedure is invoked, the block 609 is entered; in this phase, the youngest erased physical block is extracted from the beginning of the free list (for use as a new root physical block for the logical block to be compacted); the new root physical block is then removed from the free list (saving its aging index into a corresponding register). Proceeding to block 612, the last versions of the logical sectors of the logical block are copied from the corresponding old root physical block and old leaf physical block into the new root physical block. The new root physical block is then inserted into the allocation list at block 615 (in the correct position according to its aging index). At this point, the old (root and leaf) physical blocks are erased at block 618; at the same time, the old physical blocks are removed from the allocation list (saving their aging indexes into corresponding registers).

A loop is then performed for each erased physical block (starting from the old leaf physical block). The loop begins at the synchronization bar 621, wherein the method forks into two branches that are executed alternatively (according to different implementations of the proposed solution). Particularly, an implementation involves the execution of the branch formed by the blocks 624-630, whereas another implementation involves the execution of the branch formed by the blocks 633-651; the two branches joint at the further synchronization bar 654.

With reference now to block 624, this branch is followed when only the youngest written physical block is taken into account by the wear leveling algorithm; in this phase, the aging index of the youngest written physical block is extracted from the beginning of the allocation list or from the corresponding register. The aging index of the erased physical block is compared with the aging index of the youngest written physical block at block 627. If their difference is higher than the threshold value, the youngest written physical block is selected for replacing the erased physical block at block 630; the method then passes to the synchronization bar 654. Conversely, the method descends into the synchronization bar 654 directly.

Considering instead block 633, this branch is followed when all the eligible written physical block are taken into account by the wear leveling algorithm; in this phase, the aging index of a current written physical block (starting from the youngest one) is extracted from the allocation list. The aging index of the erased physical block is compared with the aging index of the (current) written physical block at block 636. If their difference is higher than the threshold value, the method verifies at block 639 the type of the current written physical block (i.e., root node or leaf node). If the written physical block is of the root type, the method at block 642 passes to the next written physical block of the allocation list; the flow of activity then returns to block 633 to repeat the same operations described above. On the contrary, when the written physical block is of the leaf type, this written physical block is selected for replacing the erased physical block at block 645; the method then descends to the synchronization bar 654. Referring back to block 636, if the difference between the aging index of the erased physical block and the aging index of the written physical block does not reach the threshold value, a test is made at block 648 to verify whether the current physical block is the first written physical block of the allocation list (i.e., the youngest one). If not, the youngest written physical block (of the root type) is selected at block 651 for replacing the erased physical block; the method then descends to the synchronization bar 654. Conversely, the synchronization bar 654 is reached directly from block 648.

In any case, the flow of activity then continues from the synchronization bar 654 to the block 657. In this phase, the method verifies whether a written physical block has been selected for replacing the erased physical block. If so, at block 660 the last versions of the logical sectors stored in the selected logical block are copied into the erased physical block (being not erased any longer). This physical block is then inserted into the allocation list (in the correct position according to its aging index) at block 663. Descending to block 666, the selected physical block is erased; at the same time, the selected physical block (now erased) is removed from the allocation list (saving its aging index into a corresponding register). The selected physical block is then inserted into the free list at block 672 (in the correct position according to its aging index being obtained by incrementing the corresponding value previously saved). The method then descends into block 675. Referring back to block 657, when no written physical block has been selected for replacing the erased physical block, the erased physical block is inserted into the free list at block 673 (in the correct position according to its aging index); the method then descends into block 675.

Considering now block 675, a test is now made to verify which erased physical block has been processed. If the above-described operations have been performed for the (erased) old leaf physical block, the method returns to block 621 to repeat the same procedure for the (erased) old root physical block. Conversely, once both the erased (old leaf and old root) physical blocks have been processed, the method ends at the concentric white/black stop circles 678.

Naturally, in order to satisfy local and specific requirements, a person skilled in the art may apply to the solution described above many logical and/or physical modifications and alterations. More specifically, although the present disclosure has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the disclosure may be incorporated in any other embodiment as a matter of general design choice.

Particularly, the proposed solution lends itself to be implemented with equivalent methods (by using similar steps, removing some steps being non-essential, or adding further optional steps); moreover, the steps may be performed in a different order, concurrently or in an interleaved way (at least in part).

Similar considerations apply if the storage device emulates an equivalent logical memory space (with a different number and/or size of the logical blocks, each one including logical sectors with a different number and/or size); likewise, the physical memory space of the flash memory may have a different number and/or size of the physical blocks, each one including physical pages with a different number and/or size.

It should be noted that the selected physical block may be either erased immediately or simply added to an invalid list for its next erasure (as described in the co-pending patent application entitled MANAGEMENT OF ERASE OPERATIONS IN STORAGE DEVICES BASED ON FLASH MEMORIES application Ser. No. 11/801, 742 the entire disclosure of which is herein incorporated by reference).

Even though in the preceding description reference has been made to a specific wear leveling algorithm, it should be readily apparent that the proposed solution may be implemented in combination with any other technique attempting to distribute the number of erasures of the blocks uniformly throughout the flash memory of the storage device (even if the stand-alone application of the proposed solution is not excluded).

Alternatively, it is possible to implement the mapping of the logical memory space on the physical memory space with different techniques (for example, by associating a tree structure with a root node and multiple child nodes with each logical sector, by storing the required information in any other way, and the like); moreover, it is possible to implement a different mapping structure and a dynamic bad block management, with the corresponding forced garbage collection procedures (as described in the co-pending patent application GARBAGE COLLECTION IN STORAGE DEVICES BASED ON FLASH MEMORIES U.S patent application ser. No. 13/196,820 the entire disclosure of which is herein incorporated by reference). Likewise, the garbage collection procedure may be controlled in a different way (for example, according to specific algorithms based on the current filling rate of the flash memory); alternatively, the wear leveling algorithm may be applied only to one out of the (erased) old root physical block and old leaf physical block (for example, only to the older one with the higher number of erasures). More generally, the proposed solution lends itself to be used whenever any physical block is erased—for example, during a recovering of the storage device following a power loss (as described in the co-pending patent application entitled RESTORING STORAGE DEVICES BASED ON FLASH MEMORIES AND RELATED CIRCUIT, SYSTEM, AND METHOD U.S. patent application Ser. No. 11/801,687 the entire disclosure of which is herein incorporated by reference).

The proposed wear leveling algorithm may also be implemented with a different procedure for copying the relevant data; for example, nothing prevents copying every physical sector (storing either a valid or an invalid logical sector) or even the whole content of the selected written physical block to the erased physical block.

The proposed aging index is merely illustrative; for example, it is possible to use a different number of bits for its storing (so as to change the corresponding allowable range accordingly); more generally, the proposed solution may be based on any equivalent information indicative of the number of erasures of the physical blocks (for example, directly stored in each physical block). In any case, the threshold value may be set in a different way; for example, the possibility of using a dynamic threshold value is not excluded (such as equal to a percentage of the aging index of an oldest physical block with the highest number of erasures).

It should be readily apparent that the above-described techniques for selecting the written physical block to be used for replacing the erased physical block are not exhaustive. For example, it is possible to implement more sophisticated algorithms (such as disabling the replacement until a minimum number of erasures is reached).

Moreover, other criteria may be used for selecting the written physical block among the eligible ones. For example, nothing prevents analyzing all the eligible written physical blocks and then choosing the one that meets a desired preference criterion based on or more characteristics of the written physical blocks (such as with the lowest number of valid logical sectors). In this way, it would be possible to actually optimize the copy of the selected written physical block onto the erased physical block (at the cost of an increased computational complexity).

Similar considerations apply if the allocation list is replaced with an equivalent structure adapted to order the written physical blocks according to their aging indexes; for example, this result may be achieved by means of a chain implemented with pointers, an ordered table, and the like.

Even though in the preceding description reference has been made to a flash memory with NAND architecture, this is not to be interpreted in a limitative manner; more generally, the proposed solution lends itself to be used in a storage device based on any other flash memory (for example, of the NOR type, of the phase-change type, and the like).

Similar considerations apply if the program (which may be used to implement each embodiment of the disclosure) is structured in a different way, or if additional modules or functions are provided; likewise, the memory structures may be of other types, or may be replaced with equivalent entities (not necessarily consisting of physical storage media). In any case, the program may take any form suitable to be used by or in connection with any control system of the storage device, such as software, firmware, or microcode. Moreover, it is possible to provide the program on any medium being adapted to be used by the control system; the medium can be any element suitable to contain, store, communicate, propagate, or transfer the program. For example, the medium may be of the electronic, magnetic, optical, electromagnetic, infrared, or semiconductor type; examples of such medium are the flash memory itself or a ROM (where the program can be pre-loaded), wires, wireless connections, broadcast waves, and the like. In any case, the solution according to an embodiment of the present disclosure lends itself to be implemented with a hardware structure (for example, integrated in a chip of semiconductor material), or with a combination of software and hardware.

Alternatively, the control system (being used to implement the wear leveling algorithm) may have a different structure or it may include equivalent components.

Likewise, the above-described architecture of the storage device is merely illustrative, and it must not be interpreted in a limitative manner.

It should be readily apparent that the proposed structure might be part of the design of an integrated circuit. The design may also be created in a programming language; moreover, if the designer does not fabricate chips or masks, the design may be transmitted by physical means to others. In any case, the resulting integrated circuit may be distributed by its manufacturer in raw wafer form, as a bare die, or in packages. Moreover, the proposed structure may be integrated with other circuits in the same chip, or it may be mounted in intermediate products (such as mother boards).

In any case, it should be noted that the storage device may be used in any other data processing system; further examples of such system are an MP3 player, a digital camera, a PDA, a laptop computer, and the like.

From the foregoing it will be appreciated that, although specific embodiments of the disclosure have been described herein for purposes of illustration, various modifications may be made without deviating from the spirit and scope of the invention.

What is claimed is:

1. A wear leveling method in a storage device based on a flash memory, the flash memory including a plurality of physical blocks adapted to be erased individually, wherein the method includes the steps for:
    comparing an index value associated with a first physical block with and index value associated with a second physical block;
    erasing one of the physical blocks in response to the comparison,
    selecting one of the physical blocks being allocated for storing data in response to the comparison and in response to reaching of a threshold by an indication of a difference between a number of erasures of the erased physical block and a number of erasures of the selected physical block,
    copying at least the data of the selected physical block being valid into the erased physical block, and
    erasing the selected physical block.

2. The method according to claim 1, further including the steps for:
    storing an aging index representing the number of erasures of each physical block in the flash memory, the aging index being adapted to span a predefined range, and
    updating the aging index of each physical block in response to the erasing of the physical block,
    wherein the threshold is equal to 30%-70% of said range.

3. The method according to claim 1, wherein the step for selecting includes:
    comparing the number of erasures of the erased physical block with the number of erasures of a youngest allocated physical block being subject to the lowest number of erasures, the youngest physical block being selected in response to the reaching of the threshold by the difference between the number of erasures of the erased physical block and the number of erasures of the selected physical block.

4. The method according to claim 1, wherein the flash memory is of the NAND type.

5. A wear leveling method in a storage device based on a flash memory, the flash memory including a plurality of physical blocks adapted to be erased individually, wherein the method includes the steps for:
    erasing one of the physical blocks,
    selecting one of the physical blocks being allocated for storing data in response to the reaching of a threshold by an indication of a difference between a number of erasures of the erased physical block and a number of erasures of the selected physical block,
    copying at least the data of the selected physical block being valid into the erased physical block, and
    erasing the selected physical block;
    wherein the storage device emulates a logical memory space, including a plurality of logical blocks each one having a plurality of logical sectors, being mapped on a physical memory space of the flash memory, including a plurality of physical blocks each one having a plurality of physical sectors, consecutive versions of the logical sectors of each logical block being stored in succession in the physical sectors of an allocated physical block of a root type and at least one allocated physical block of a child type when the root physical block is full, the method further including the steps for:
    compacting an old root physical block and at least one old child physical block storing a current logical block into a new root physical block storing the last versions only of the logical sectors of the current logical block, and
    erasing the old root physical block and the at least one old child physical block, the erased physical block consisting of the erased old root physical block and/or the at least one erased old child physical block.

6. The method according to claim 5, wherein the step for copying includes:
    copying the last versions only of the logical sectors of the selected physical block into the erased physical block.

7. The method according to claim 6, wherein for each one of a set of eligible allocated physical blocks the difference between the number of erasures of the erased physical block and the number of erasures of the eligible allocated physical block reaches the threshold, the step for selecting including:
    selecting one of the eligible allocated physical blocks according to a preference criteria based on at least one characteristic of the eligible allocated physical blocks.

8. The method according to claim 7, wherein the step for selecting includes:
    selecting a youngest eligible allocated physical block being subject to the lowest number of erasures among the eligible allocated physical blocks of the child type when available or among all the eligible allocated physical blocks otherwise.

9. The method according to claim 7, further including the steps for:
    maintaining a list ordering the allocated physical blocks according to the corresponding number of erasures, the eligible allocated physical blocks being determined according to said list.

* * * * *